(12) United States Patent
Wu et al.

(10) Patent No.: US 10,735,923 B2
(45) Date of Patent: Aug. 4, 2020

(54) TECHNIQUES AND APPARATUSES FOR BEAM-BASED SCHEDULING OF VEHICLE-TO-EVERYTHING (V2X) COMMUNICATIONS

(71) Applicant: QUALCOMM Incorporated, San Diego, CA (US)

(72) Inventors: Zhibin Wu, Bedminster, NJ (US); Junyi Li, Chester, NJ (US); Sudhir Kumar Baghel, Hillsborough, NJ (US); Kapil Gulati, Dover, DE (US); Libin Jiang, Bridgewater, NJ (US); Tien Viet Nguyen, Bedminster, NJ (US); Shailesh Patil, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 78 days.

(21) Appl. No.: 16/125,155

(22) Filed: Sep. 7, 2018

(65) Prior Publication Data

US 2019/0124490 A1   Apr. 25, 2019

Related U.S. Application Data

(60) Provisional application No. 62/576,482, filed on Oct. 24, 2017.

(51) Int. Cl.
*H04W 4/00* (2018.01)
*H04W 4/40* (2018.01)
(Continued)

(52) U.S. Cl.
CPC ............ *H04W 4/40* (2018.02); *H04W 72/046* (2013.01); *H04W 72/12* (2013.01)

(58) Field of Classification Search
USPC ........................................................ 370/329
See application file for complete search history.

(56) References Cited

U.S. PATENT DOCUMENTS

2020/0014453 A1* 1/2020 Takeda .................. H04L 5/0051

FOREIGN PATENT DOCUMENTS

EP   3373641 A1 *  9/2018   ............ H04W 72/02
EP   3373641 A1    9/2018
(Continued)

OTHER PUBLICATIONS

Fujitsu: "Prioritization-based Resource Allocation for Sidelink-based V2V Communication," 3GPP Draft; R1-162393 Final, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016, Apr. 1, 2016, XP051079561, 2 pages, Retrieved from the Internet: URL: http://www.3gpp.org/ftp/tsg_ran/WG1_RL1/TSGR1_84b/Docs/ [retrieved on Apr. 1, 2016].
(Continued)

*Primary Examiner* — Phuongchau Ba Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a transmitter user equipment may determine a beam to be used to transmit a vehicle-to-everything (V2X) communication to a receiver UE; may determine one or more eligible resource blocks of the beam that are candidates for the V2X communication based at least in part on a schedule associated with the beam; may transmit, to the receiver UE, a proposed schedule that indicates the one or more eligible resource blocks of the beam that are candidates for the V2X communication; and may transmit the V2X communication to the receiver UE via the beam based at least in part on transmitting the proposed schedule. Numerous other aspects are provided.

30 Claims, 8 Drawing Sheets

(51) Int. Cl.
*H04W 72/12* (2009.01)
*H04W 72/04* (2009.01)

(56) References Cited

FOREIGN PATENT DOCUMENTS

| WO | 2017078477 A1 | 5/2017 | | |
|---|---|---|---|---|
| WO | 2017136001 A1 | 8/2017 | | |
| WO | WO-2017136001 A1 * | 8/2017 | .......... | H04W 72/048 |

OTHER PUBLICATIONS

International Search Report and Written Opinion—PCT/US2018/050277—ISA/EPO—dated Nov. 29, 2018.
Samsung: "MIMO Support for V2X Multicasting," 3GPP Draft; R1-164791 MIMO Support for V2X Multicasting R1, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 13, 2016, XP051096709, 8 pages, Retrieved from the Internet: URL: http://www.3gpp.org/ftp/tsg_ran/WG1_RL1/TSGR1_85/Docs/ [retrieved on May 13, 2016].

* cited by examiner

TECHNIQUES AND APPARATUSES FOR BEAM-BASED SCHEDULING OF VEHICLE-TO-EVERYTHING (V2X) COMMUNICATIONS

CROSS-REFERENCE TO RELATED APPLICATIONS UNDER 35 U.S.C. § 119

This application claims priority to U.S. Provisional Patent Application No. 62/576,482, filed on Oct. 24, 2017, entitled "TECHNIQUES AND APPARATUSES FOR BEAM-BASED SCHEDULING OF VEHICLE-TO-EVERYTHING (V2X) COMMUNICATIONS," which is hereby expressly incorporated by reference herein.

FIELD OF THE DISCLOSURE

Aspects of the present disclosure generally relate to wireless communication, and more particularly to techniques and apparatuses for beam-based scheduling of vehicle-to-everything (V2X) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may be performed by a transmitter user equipment (UE). The method may include determining a beam to be used to transmit a vehicle-to-everything (V2X) communication to a receiver UE; determining one or more eligible resource blocks of the beam that are candidates for the V2X communication based at least in part on a schedule associated with the beam; transmitting, to the receiver UE, a proposed schedule that indicates the one or more eligible resource blocks of the beam that are candidates for the V2X communication; and transmitting the V2X communication to the receiver UE via the beam based at least in part on transmitting the proposed schedule.

In some aspects, a transmitter UE for wireless communication may include memory and one or more processors operatively coupled to the memory. The memory and the one or more processors may be configured to determine a beam to be used to transmit a vehicle-to-everything (V2X) communication to a receiver UE; determine one or more eligible resource blocks of the beam that are candidates for the V2X communication based at least in part on a schedule associated with the beam; transmit, to the receiver UE, a proposed schedule that indicates the one or more eligible resource blocks of the beam that are candidates for the V2X communication; and transmit the V2X communication to the receiver UE via the beam based at least in part on transmitting the proposed schedule.

In some aspects, a non-transitory computer-readable medium may store one or more instructions for wireless communication. The one or more instructions, when executed by one or more processors of a transmitter UE, may cause the one or more processors to determine a beam to be used to transmit a vehicle-to-everything (V2X) communication to a receiver UE; determine one or more eligible resource blocks of the beam that are candidates for the V2X communication based at least in part on a schedule associated with the beam; transmit, to the receiver UE, a proposed schedule that indicates the one or more eligible resource blocks of the beam that are candidates for the V2X communication; and transmit the V2X communication to the receiver UE via the beam based at least in part on transmitting the proposed schedule.

In some aspects, a transmitter apparatus for wireless communication may include means for determining a beam to be used to transmit a vehicle-to-everything (V2X) communication to a receiver apparatus; means for determining one or more eligible resource blocks of the beam that are candidates for the V2X communication based at least in part on a schedule associated with the beam; means for transmitting, to the receiver apparatus, a proposed schedule that indicates the one or more eligible resource blocks of the beam that are candidates for the V2X communication; and means for transmitting the V2X communication to the receiver apparatus via the beam based at least in part on transmitting the proposed schedule.

Aspects generally include a method, device, transmitter device, receiver device, apparatus, transmitter apparatus, receiver apparatus, computer program product, non-transitory computer-readable medium, user equipment, transmitter user equipment, receiver user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
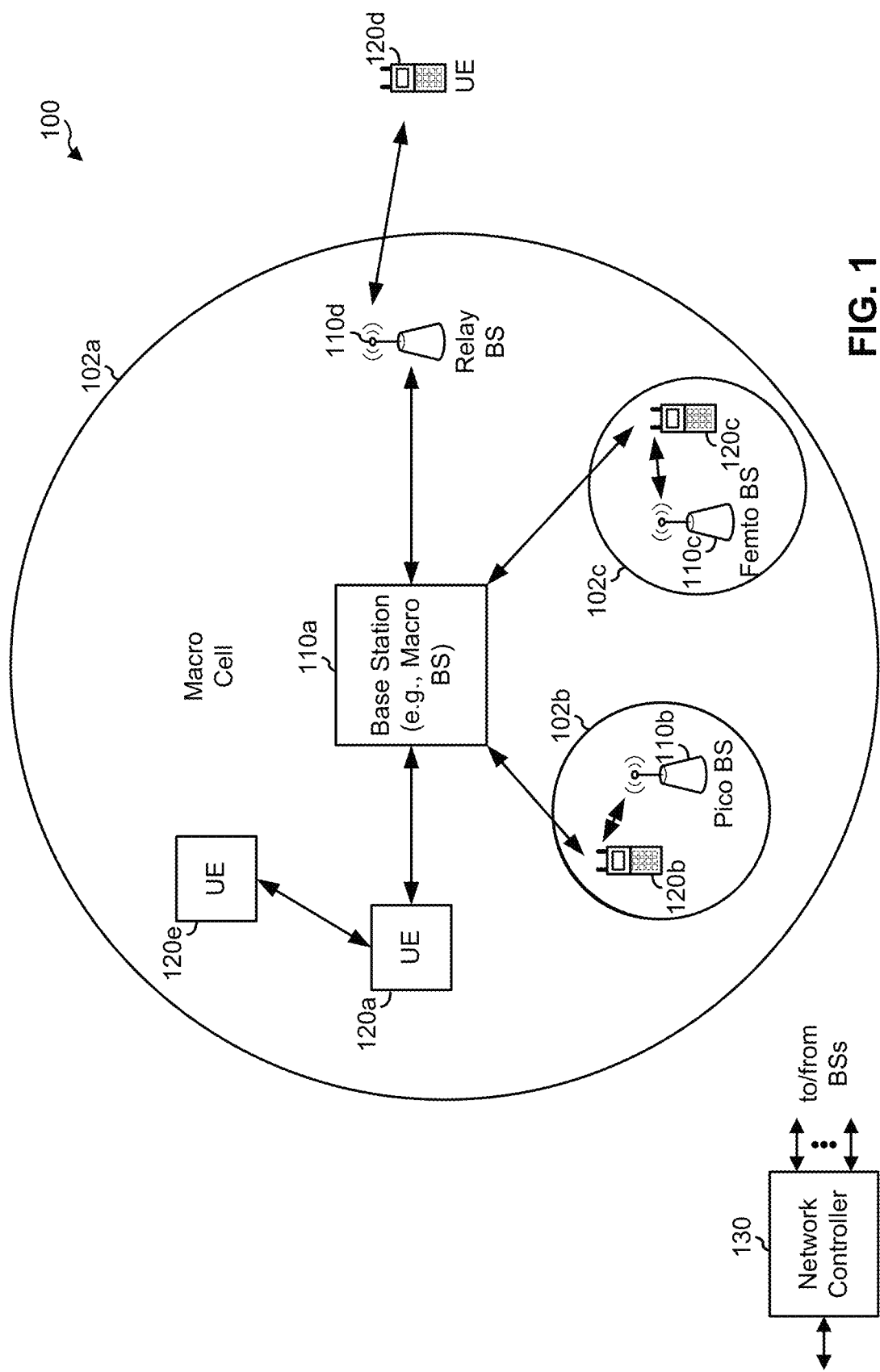
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 2100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
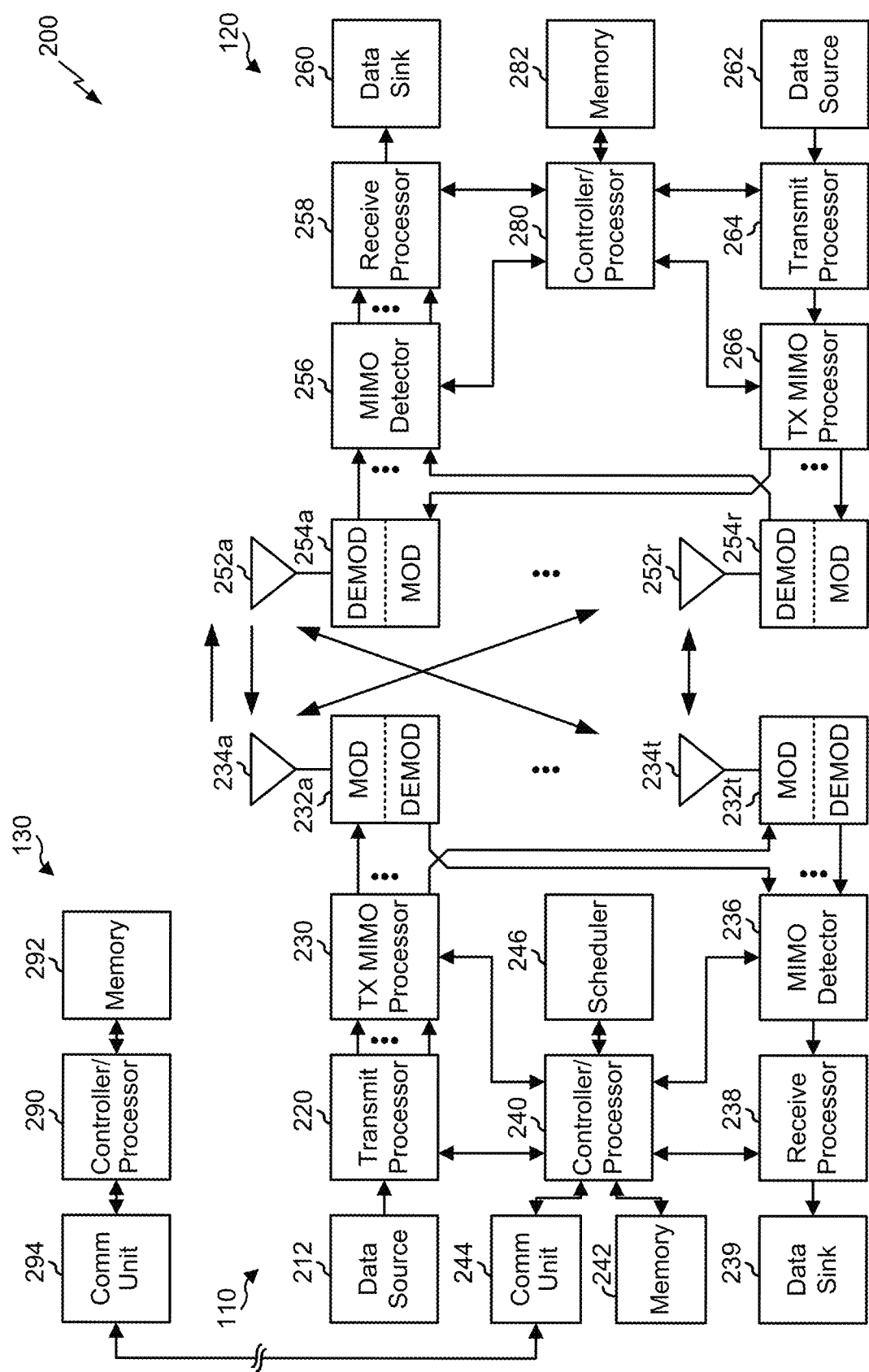
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Although FIG. 2 illustrates components of a base station 110, a UE 120, and a network controller 130 for completeness, in some aspects, two or more UEs 120 may communicate directly with one another via a sidelink (e.g., without communicating with a base station 110 as an intermediary). In this case, one or more components of the UE 120 may perform one or more operations or functions described herein as being performed by one or more components of the base station 110 (e.g., for scheduling, resource selection, and/or the like).

In some aspects, one or more components of UE 120 may be included in a housing. Controller/processor 240 of base station 110, controller/processor 280 of UE 120, and/or any other component(s) of FIG. 2 may perform one or more techniques associated with beam-based scheduling of V2X communications, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a beam to be used to transmit a V2X communication, means for determining one or more eligible resource blocks of the beam that are candidates for the V2X communication based at least in part on a schedule associated with the beam, means for transmitting a proposed schedule that indicates the one or more eligible resource blocks of the beam that are candidates for the V2X communication, means for transmitting the V2X communication based at least in part on the proposed schedule, and/or the like. Additionally, or alternatively, UE 120 may include means for receiving a rejection of the proposed schedule from the receiver UE, means for receiving an updated schedule from the receiver UE, means for determining a different one or more eligible resource blocks of the beam to be used for the V2X communication based at least in part on the updated schedule, means for transmitting the V2X communication to the receiver UE using the different one or more eligible resource blocks of the beam. Additionally, or alternatively, UE 120 may include means for updating the schedule for the beam to indicate one or more selected resource blocks to be used to transmit the V2X communication, means for transmitting the updated schedule for the beam to one or more neighbor UEs, and/or the like. Additionally, or alternatively, UE 120 may include means for performing one or more other operations described herein. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
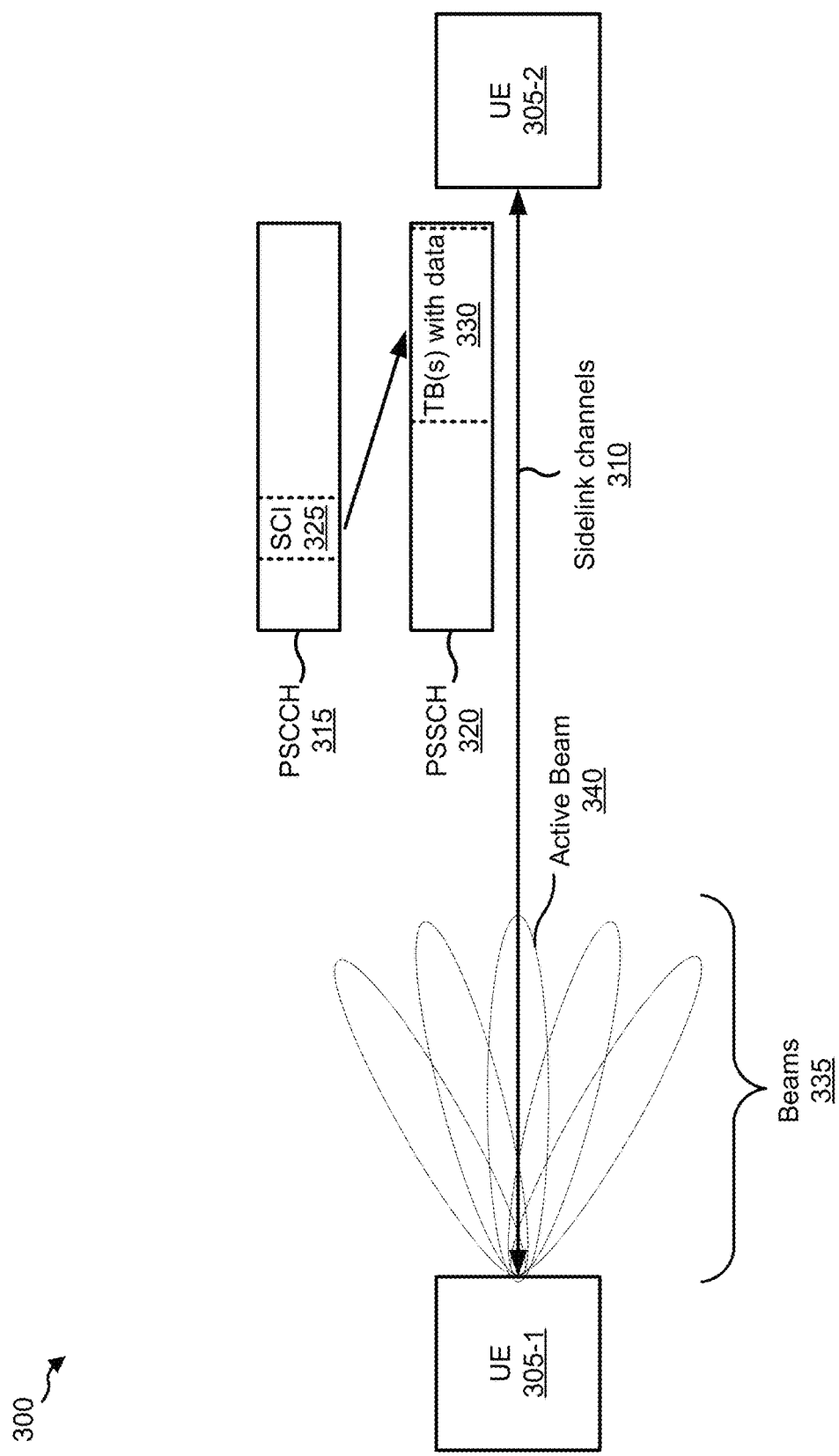
FIG. 3 is a block diagram conceptually illustrating an example of V2X communications via a sidelink, in accordance with various aspects of the present disclosure.

FIG. 3 is a block diagram conceptually illustrating an example 300 of V2X communications via a sidelink, in accordance with various aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit V2X communications using the sidelink channel 310.

In some aspects, V2X transmissions may be one-to-many broadcast and/or multicast transmissions. In some aspects, V2X transmissions may not require any physical layer feedback from receiving devices, such as acknowledgement (ACK) or negative acknowledgement (NACK) feedback. In some aspects, V2X transmissions may be configured without retransmission. In some aspects, V2X transmissions may be configured with a small number of retransmissions (e.g., one retransmission) that always occur (e.g., without ACK/NACK feedback).

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time, frequency, and/or beam resources) where a transport block (TB) 330 that includes data is carried on the PSSCH 320 and/or other control information that may be used to assist in receiving, decoding, and/or demodulating data carried via the PSSCH 320. The TB 330 may include V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, the V2X data may include data relevant to operation of a vehicle associated with a UE 305.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

As further shown in FIG. 3, a UE 305 may communicate with other UEs 305 using one or more beams 335. For example, the UEs 305 may include multiple antenna elements to support beamforming using millimeter wave beams 335 in the millimeter wave frequency band. In some aspects, the UE 305 may support and/or dynamically configure different beam widths for a beam 335, which may change the range of the beam 335 (e.g., a wider beam with a shorter range or a narrower beam with a longer range). A millimeter wave beam 335 may be capable of higher throughput than a sub-6 GHz transmission, which may be useful for V2X communications (e.g., to transmit camera feeds and/or the like).

As shown, the first UE 305-1 may communicate with the second UE 305-2 using an active beam 340. In some aspects, the first UE 305-1 may communicate with one or more other UEs 305 using one or more other beams 335. In some aspects, a UE 305 may be limited in the number of beams 335 that can be used to concurrently transmit and/or receive communications (e.g., that can concurrently be active). In some aspects, the limit may be based at least in part on the number of antenna arrays included in the UE 305. For example, the UE 305 may be limited to using only a single beam 335 at a particular time (e.g., a transmission time interval, such as a slot, a subframe, and/or the like), may be limited to using only two beams 335 at a particular time, and/or the like.

Because beams 335 are a limited resource, a UE 305 must account for this resource when scheduling communications for transmission, in addition to accounting for time and frequency resources. Scheduling decisions may be further complicated because the first UE 305-1 may not have information regarding a direction of an active beam 340 of the second UE 305-2, and thus may not be able to determine whether the second UE 305-2 is available to receive a transmission from the first UE 305-1.

Some techniques and apparatuses described herein account for beam directionality when scheduling V2X communications. This may improve scheduling decisions in V2X communication systems, increase a likelihood of successful reception of a V2X transmission, reduce interference in V2X communication systems, allow for more efficient scheduling of V2X communications, and/or the like.

As indicated above, FIG. 3 is provided merely as an example. Other examples are possible and may differ from what was described with regard to FIG. 3.

Figure 4:
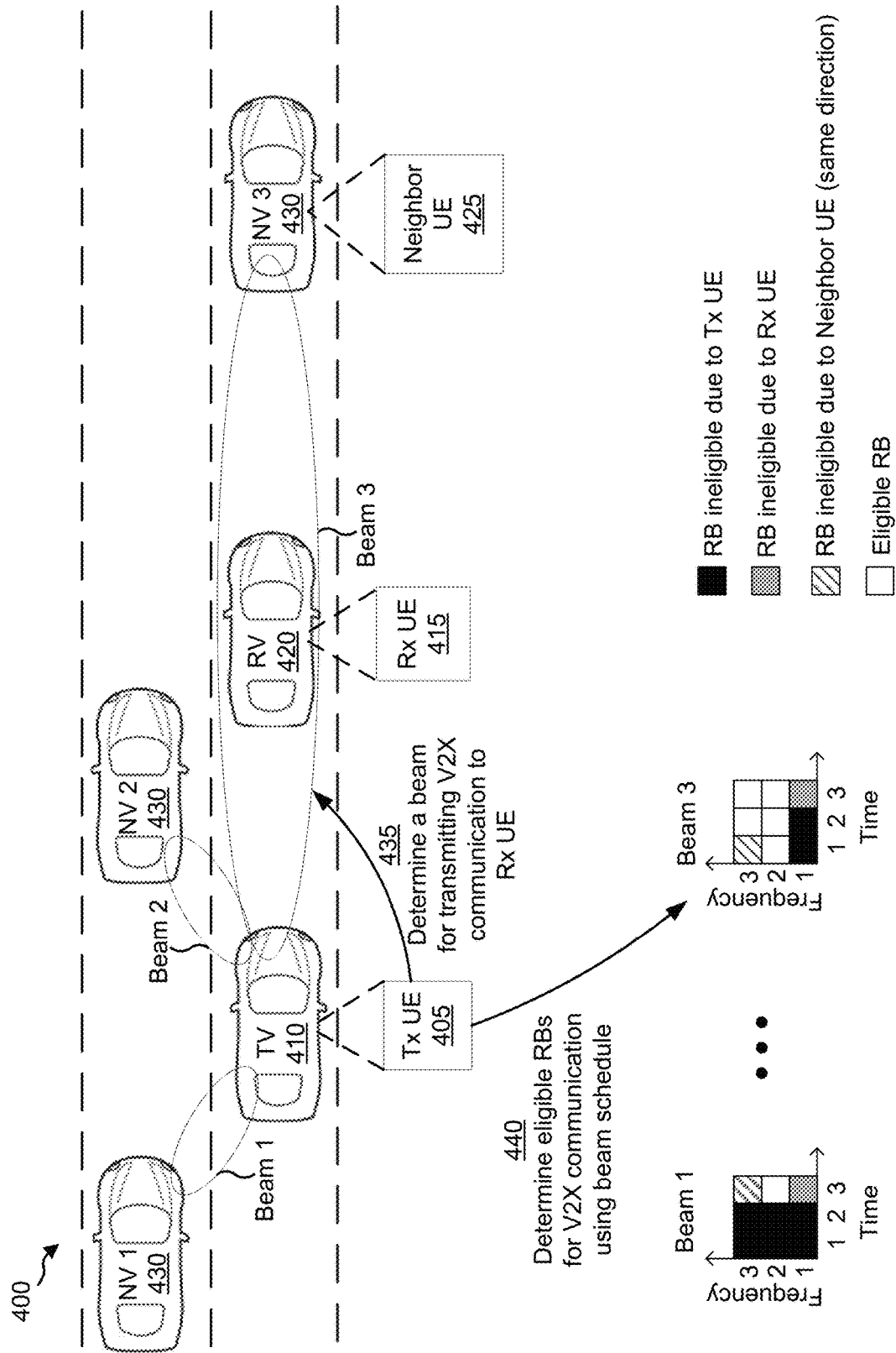
FIGS. 4-7 are diagrams illustrating examples of beam-based scheduling of V2X communications, in accordance with various aspects of the present disclosure.

FIG. 4 is a diagram illustrating an example 400 of beam-based scheduling of V2X communications, in accordance with various aspects of the present disclosure.

As shown in FIG. 4, a transmitter UE 405 may be associated with a transmitter vehicle (TV) 410, a receiver UE 415 may be associated with a receiver vehicle (RV) 420, and one or more neighbor UEs 425 may be associated with a corresponding one or more neighbor vehicles (NV) 430. The transmitter UE 405, the receiver UE 415, and/or the neighbor UE(s) 425 may correspond to one or more UEs described elsewhere herein, such as UE 120, UE 305, and/or the like. In some aspects, a UE 405, 415, 425 may be integrated into a vehicle 410, 420, 430, may be located in or on the vehicle 410, 420, 430, and/or the like. A vehicle 410, 420, 430 may include an autonomous vehicle, a semi-autonomous vehicle, a non-autonomous vehicle, and/or the like. Although UEs 405, 415, 425 in FIG. 4 are shown as being associated with vehicles 410, 420, 430, in some aspects, one or more of the UEs 405, 415, 425 may not be associated with a vehicle 410, 420, 430. For example, a UE 405, 415, 425 may be associated with infrastructure (e.g., traffic infrastructure, such as a traffic signal, a lane signal, a sensor, a traffic controller system, and/or the like), a pedestrian (e.g., via a wearable device), and/or the like.

The transmitter UE 405, the receiver UE 415, and/or the neighbor UE(s) 425 may communicate via one or more sidelink channels 310 to exchange SCI 325 and corresponding TBs 330, as described above in connection with FIG. 3. As used herein, the terms transmitter UE 405 and transmitter vehicle 410 are used to describe a UE and/or vehicle that schedules transmission of a particular V2X communication and transmits the particular V2X communication to a receiver UE 415. As used herein, the terms receiver UE 415 and receiver vehicle 420 are used to describe a UE and/or vehicle that receives the particular V2X communication from the transmitter UE 405. As used herein, the terms neighbor UE 425 and neighbor vehicle 430 are used to describe a UE and/or vehicle that does not transmit or receive the particular V2X communication, but that may impact scheduling of the particular V2X communication. Thus, a single UE may be capable of operating as a transmitter UE 405 (e.g., that transmits V2X communications to other UEs), a receiver UE 415 (e.g., that receives V2X communications from other UEs), and a neighbor UE 425 (e.g., that impacts scheduling decisions of other UEs).

As shown by reference number 435, the transmitter UE 405 may determine a beam to be used to transmit a V2X communication to the receiver UE 415. The V2X communication may include SCI 325 and/or one or more TBs 330, as described above in connection with FIG. 3. As shown in FIG. 4, based at least in part on locations of vehicles in the vicinity of the transmitter vehicle 410, the transmitter UE 405 may determine that a first beam (shown as Beam 1) is to be used to communicate with a first neighbor UE 425 (associated with NV 1), a second beam (shown as Beam 2) is to be used to communicate with a second neighbor UE 425 (associated with NV 2), and a third beam (shown as Beam 3) is to be used to communicate with a third neighbor UE 425 (associated with NV3) and the receiver UE 415. Thus, in some cases, the transmitter UE 405 may use a single beam to communicate with multiple UEs located along the path of the beam. As shown, the transmitter UE 405 may determine that Beam 3 is to be used to communicate with the receiver UE 415 due to the location of the receiver UE 415 relative to the transmitter UE 405.

As shown by reference number 440, the transmitter UE 405 may determine one or more resource blocks (RBs) of the beam that are eligible for the V2X communication based at least in part on a schedule associated with the beam. In some aspects, different beams may be associated with different schedules, and may have different resource blocks available (e.g., eligible) for V2X communications.

In some aspects, a resource block may not be eligible for the V2X communication if the resource block is already scheduled to be used by the transmitter UE 405. For example, if the transmitter UE 405 is scheduled to transmit a V2X communication using a resource block, then the transmitter UE 405 may not schedule transmission of another V2X communication using that resource block. Additionally, or alternatively, if the transmitter UE 405 is not capable of operating in a full duplex mode, and the transmitter UE 405 is scheduled to receive a V2X communication using a resource block, then the transmitter UE 405 may not schedule transmission of a V2X communication using that resource block. Additionally, or alternatively, the transmitter UE 405 may only be capable of transmitting and/or receiving V2X communications on a limited number of beams (e.g., one beam, two beams, etc.) concurrently. Thus, if the transmitter UE 405 is scheduled to transmit and/or receive on a first beam at a particular time, the transmitter UE 405 may not be able to schedule a V2X communication on a second beam at the particular time.

In example 400, the transmitter UE 405 is scheduled to transmit a V2X communication on Beam 3 on Frequency 1 at Time 1 and Time 2. As a result, these RBs on Beam 3 are not eligible for scheduling another V2X communication to be transmitted by the transmitter UE 405. Furthermore, on Beam 1, all of the RBs that occur at Time 1 or Time 2 are not eligible for scheduling a V2X communication (e.g., assuming that the transmitter UE 405 is capable of transmitting on only a single beam at a time). However, these RBs would be eligible for scheduling a V2X communication if the transmitter UE 405 is capable of concurrent transmission on multiple beams (e.g., subject to a maximum number of beams on which the transmitter UE 405 is capable of using for concurrent transmission).

In some aspects, a resource block may not be eligible for the V2X communication if the resource block is already scheduled to be used by the receiver UE 415. For example, if the receiver UE 415 is scheduled to transmit a V2X communication using a resource block, then the transmitter UE 405 may not schedule transmission of another V2X communication to the receiver UE 415 using that resource block (e.g., unless the receiver UE 415 is capable of operating in a full duplex mode). Additionally, or alternatively, if the receiver UE 415 is scheduled to receive a V2X communication using a resource block, then the transmitter UE 405 may not schedule transmission of a V2X communication to the receiver UE 415 using that resource block. Additionally, or alternatively, the receiver UE 415 may only be capable of transmitting and/or receiving V2X communications on a limited number of beams (e.g., one beam, two beams, etc.) concurrently. Thus, if the receiver UE 415 is scheduled to transmit and/or receive on a first beam at a particular time, the transmitter UE 405 may not be able to transmit a V2X communication to the receiver UE 415 on a second beam at the particular time.

In example 400, the receiver UE 415 is scheduled to either transmit or receive a V2X communication on Beam 3 on Frequency 1 at Time 3. As a result, this RB is not eligible for scheduling a V2X communication to be transmitted by the transmitter UE 405 to the receiver UE 415. For example, if the receiver UE 415 is scheduled to transmit a V2X communication on Beam 3 on Frequency 1 at Time 3, then the receiver UE 415 may not be able to receive a V2X transmission from the transmitter UE 405 at Frequency 1, 2, 3 and other frequencies at Time 3. If the receiver UE 415 is scheduled to receive a V2X communication on Beam 3 on Frequency 1 at Time 3, then the receiver UE 415 may not be able to receive a V2X transmission from the transmitter UE 405 on Frequency 1 at Time 3. However, this RB would be eligible for scheduling a V2X communication if the receiver UE 415 is transmitting using this RB and is capable of operating in a full duplex mode (e.g., if the receiver UE 415 is not scheduled to receive a communication using this RB). In this way, the transmitter UE 405 may schedule transmissions to increase the likelihood of reception by the receiver UE 415. In some aspects, if the receiver UE 415 has scheduled a resource block for a V2X communication in a same beam direction as Beam 3, then that resource block may be ineligible for a V2X communication from the transmitter UE 405 to the receiver UE 415. However, other resource blocks associated with the same time and a different frequency may be eligible for the V2X communication. For example, while a resource block with Frequency 1 at Time 3 is ineligible, the resource blocks with Frequency 2 and Frequency 3 at Time 3 are eligible.

In some aspects, a resource block may not be eligible for the V2X communication if the resource block is already scheduled to be used by a neighbor UE 425 located in a same direction as the receiver UE 415 relative to the transmitter UE 405 (e.g., a neighbor UE 425 with which the transmitter UE 405 would communicate using a same beam as the beam used by the transmitter UE 405 to communicate with the receiver UE 415). For example, if the neighbor UE 425 is scheduled to transmit a V2X communication using a resource block of a beam, then the transmitter UE 405 may not schedule transmission of a V2X communication to the receiver UE 415 using that resource block of the beam (e.g., to reduce interference between multiple V2X communications). Additionally, or alternatively, if the neighbor UE 425 is scheduled to receive a V2X communication using a resource block of a beam, then the transmitter UE 405 may not schedule transmission of a V2X communication using that resource block of the beam.

Thus, the transmitter UE 405 may determine that a resource block in a beam schedule is ineligible for the V2X communication if one or more neighbor UEs 425 are communicating using the resource block in a same beam direction as the beam to be used to transmit the V2X communication to the receiver UE 415. Conversely, the transmitter UE 405 may determine that a resource block in the beam schedule is eligible for the V2X communication if no neighbor UEs 425 are communicating using the resource block in a same beam direction as the beam to be used to transmit the V2X communication to the receiver UE 415.

In example 400, the neighbor UE 425 associated with NV 3 is located in a same direction as the receiver UE 415 relative to the transmitter UE 405 (e.g., along a path of Beam 3). In this case, the schedule of the neighbor UE 425 associated with NV 3 impacts scheduling decisions of the transmitter UE 405 on Beam 3. As shown, the neighbor UE 425 is scheduled to either transmit or receive a V2X communication on Beam 3 on Frequency 3 at Time 1. As a result, this RB is not eligible for scheduling a V2X communication to be transmitted by the transmitter UE 405 to the receiver UE 415. In this way, the transmitter UE 405 may schedule transmissions to reduce interference.

Thus, as described above, the transmitter UE 405 may determine a schedule associated with a beam based at least in part on one or more scheduled V2X communications of the transmitter UE 405, one or more scheduled V2X communications of the receiver UE 415, and/or one or more scheduled V2X communications of one or more neighbor UEs 425. The one or more neighbor UEs 425 may be different from the receiver UE 415, and may be associated with a same beam direction as the receiver UE 415. The schedule may indicate resource blocks that have been scheduled by the transmitter UE 405, the receiver UE 415, and/or the neighbor UE(s) 425. The transmitter UE 405 may use the schedule to determine one or more resource blocks that are eligible and/or ineligible for scheduling a V2X communication to be transmitted by the transmitter UE 405 to the receiver UE 415.

In some aspects, the UEs 405, 415, and/or 425 may exchange schedules. For example, the transmitter UE 405 may receive a schedule from the receiver UE 415, may receive a schedule from one or more neighbor UEs 425, and/or the like. Additionally, or alternatively, the transmitter UE 405 may transmit a schedule to the receiver UE 415, may transmit a schedule to one or more neighbor UEs 425, and/or the like. In some aspects, the schedule transmitted by a UE may indicate only the resource blocks scheduled for V2X communications of that UE. In some aspects, the schedule transmitted by a UE may indicate resource blocks scheduled for V2X communications of that UE and resource blocks scheduled for V2X communications of other UEs. For example, if a first UE communicates with a second UE via a particular beam, then the first UE may transmit a schedule that indicates resource blocks scheduled for the beam. Additionally, or alternatively, when a first UE communicates its schedule to a second UE via a particular beam, the first UE may indicate that certain resource blocks are eligible or ineligible to be scheduled for this beam (and/or the same beam in the reverse direction), e.g., due to other scheduled communication activities using this beam or other beams.

In some aspects, a UE 405, 415, 425 may periodically transmit a schedule. Additionally, or alternatively, a UE 405, 415, 425 may transmit a schedule based at least in part on occurrence of an event, such as a modification to the schedule. In some aspects, the transmitter UE 405 may determine eligible resource blocks for a V2X communication after receiving a schedule (e.g., associated with the beam via which the V2X communication is to be transmitted) from the receiver UE 415 and/or one or more neighbor UEs 425 (e.g., that are to communicate in the same beam direction). In this way, the transmitter UE 405 may schedule a V2X communication for transmission via a beam using a current schedule associated with the beam.

As indicated above, FIG. 4 is provided as an example. Other examples are possible and may differ from what was described with respect to FIG. 4.

Figure 5:
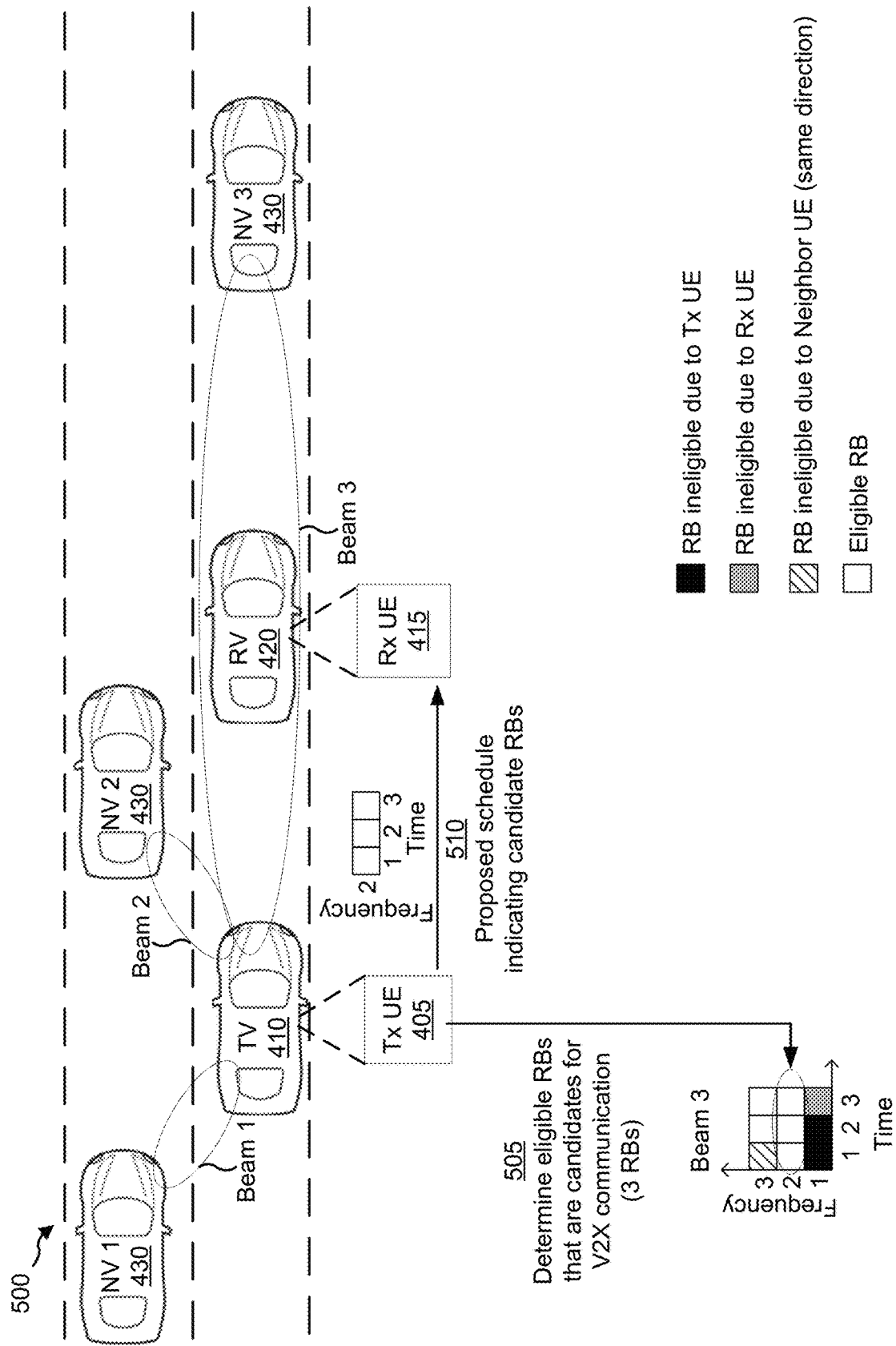

FIG. 5 is a diagram illustrating an example 500 of beam-based scheduling of V2X communications, in accordance with various aspects of the present disclosure.

As shown by reference number 505, the transmitter UE 405 (e.g., described above in connection with FIG. 4) may determine one or more eligible resource blocks of the beam that are candidates for a V2X communication to be transmitted to the receiver UE 415 (e.g., described above in connection with FIG. 4). For example, the transmitter UE 405 may determine one or more eligible resource blocks using a schedule associated with the beam, as described above in connection with FIG. 4. The transmitter UE 405 may then determine eligible RBs that are candidates for the V2X communication.

In some aspects, the transmitter UE 405 may determine eligible RBs that are candidate for the V2X communication based at least in part on a traffic demand associated with the V2X communication. For example, the transmitter UE 405 may determine a number of RBs (e.g., a number of time and/or frequency resources) needed for the V2X communication. In some aspects, the transmitter UE 405 may determine the number of RBs based at least in part on a payload size of the V2X communication, a modulation or coding scheme (MCS) to be used for the V2X communication, a number of repetitions to be used for the V2X communication, and/or the like. The transmitter UE 405 may then select the number of RBs from the eligible RBs in the beam schedule.

In example 500, the transmitter UE 405 determines that 3 RBs are needed for the V2X communication, and identifies 3 consecutive RBs at Frequency 2 and Time 1, 2, and 3. In some aspects, the transmitter UE 405 may select nonconsecutive RBs and/or RBs with different frequencies. In some aspects, the transmitter UE 405 may apply one or more rules to select candidate RBs, such as a preference for consecutive RBs over non-consecutive RBs, a preference for RBs in the same frequency over RBs in different frequencies, a preference for RBs that will occur sooner in time over RBs that will occur later in time, and/or the like.

In some aspects, the transmitter UE 405 may determine that there are not enough eligible resource blocks in the schedule to transmit the V2X communication. For example, if the V2X communication were to require 6 RBs, then the schedule shown in FIG. 5 would not have enough eligible RBs to permit transmission of the V2X communication. In this case, the transmitter UE 405 may wait to receive an updated schedule associated with the beam to be used for transmission of the V2X communication (e.g., Beam 3). Additionally, or alternatively, the transmitter UE 405 may request the updated schedule from the receiver UE 415 and/or one or more neighbor UEs 425.

After receiving the updated schedule from the receiver UE 415 and/or one or more neighbor UEs 425, the transmitter UE 405 may determine whether there are enough eligible RBs in the updated schedule to transmit the V2X communication. If there are enough eligible RBs, then the transmitter UE 405 may select the number of required RBs as candidate RBs from the eligible RBs in the beam schedule. If there are not enough eligible RBs, then the transmitter UE 405 may again wait for an updated schedule and/or request an updated schedule, and so on.

As shown by reference number 510, the transmitter UE 405 may transmit, to the receiver UE 415, a proposed schedule that indicates the one or more candidate RBs for the V2X communication (e.g., the one or more eligible resource blocks of the beam that are candidates for the V2X communication). In example 500, the transmitter UE 405 transmits a proposed schedule that indicates the candidate RBs on Frequency 2 of Beam 3 at Times 1, 2, and 3.

The transmitter UE 405 may transmit the V2X communication to the receiver UE 415 via the beam based at least in part on transmitting the proposed schedule. For example, if the receiver UE 415 confirms the proposed schedule, then the transmitter UE 405 may transmit the V2X communication using the candidate RBs indicated in the schedule, as described in more detail below in connection with FIG. 6. If the receiver UE 415 rejects the proposed schedule, then the transmitter UE 405 may select other candidate RBs until the selected candidate RBs are confirmed by the receiver UE 415, as described in more detail below in connection with FIG. 7. In this way, the transmitter UE 405 may account for a beam-specific schedule when scheduling V2X communications.

As indicated above, FIG. 5 is provided as an example. Other examples are possible and may differ from what was described with respect to FIG. 5.

Figure 6:
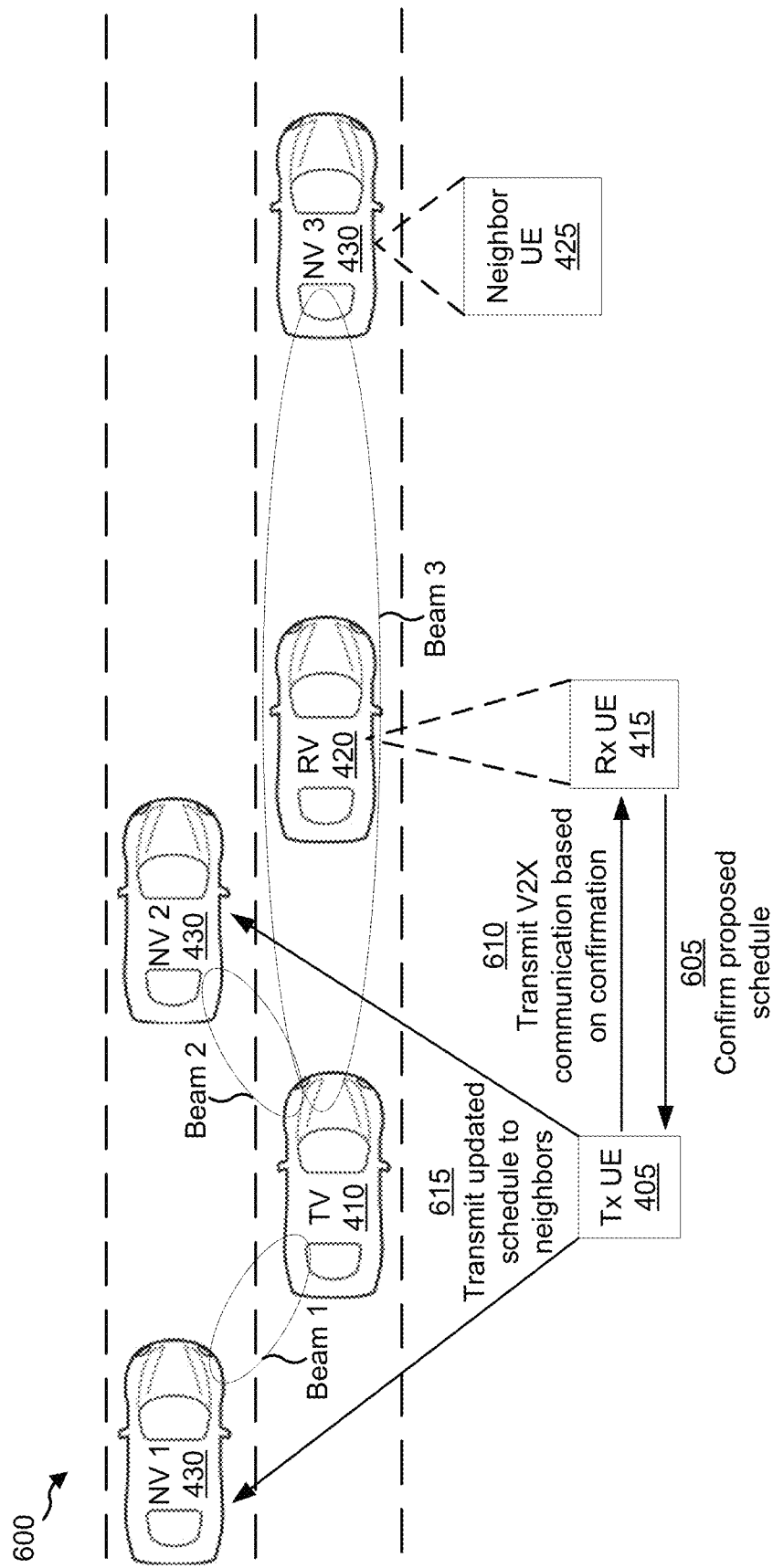

FIG. 6 is a diagram illustrating an example 600 of beam-based scheduling of V2X communications, in accordance with various aspects of the present disclosure. FIG. 6 shows an example where the receiver UE 415 (e.g., described above in connection with FIGS. 4 and 5) confirms a proposed schedule received from the transmitter UE 405 (e.g., described above in connection with FIGS. 4 and 5).

As shown by reference number 605, the transmitter UE 405 may receive a confirmation of the proposed schedule from the receiver UE 415. For example, the receiver UE 415 may receive the proposed schedule from the transmitter UE 405, and the proposed schedule may indicate one or more candidate RBs. The receiver UE 415 may determine whether the candidate RB(s) are eligible for the V2X transmission based at least in part on a schedule stored by the receiver UE 415. The schedule may be associated with the beam via which the V2X transmission is to be transmitted.

In some cases, a schedule stored by the transmitter UE 405 may not match a schedule stored by the receiver UE 415 (e.g., because one or both of the UEs have updated the schedule since the last time the schedule was exchanged). Thus, the receiver UE 415 may use a schedule stored by the receiver UE 415 to confirm that the candidate RBs, identified by the transmitter UE 405 using a schedule stored by the transmitter UE 405, are eligible for the V2X transmission. If the receiver UE 415 determines that the candidate RBs are eligible for the V2X transmission based at least in part on the schedule stored by the receiver UE 415, then the receiver UE 415 may transmit a confirmation of the proposed schedule (e.g., the proposed candidate RBs) to the transmitter UE 405.

As shown by reference number 610, the transmitter UE 405 may transmit the V2X communication using the one or more candidate RBs (e.g., the one or more eligible RBs indicated as candidates for the V2X communication in the proposed schedule) based at least in part on receiving the confirmation of the proposed schedule from the receiver UE 415. In this way, interference and RB conflicts may be reduced or eliminated.

As shown by reference number 615, in some aspects, the transmitter UE 405 may transmit an updated schedule to one or more neighbor UEs 425 and/or the receiver UE 415. For example, the transmitter UE 405 may update a schedule for one or more beams to indicate eligible and/or ineligible RBs for the one or more beams, in a similar manner as described above in connection with FIG. 4, and may transmit the updated schedule. The schedule may be updated based at least in part on the candidate RBs selected for transmission of the V2X communication.

In some aspects, the transmitter UE 405 may transmit a schedule for a beam to only the neighbor UEs 425 located in a direction of the beam. For example, the transmitter UE 405 may transmit an updated schedule for Beam 1 to a neighbor UE 425 associated with NV 1, may transmit an updated schedule for Beam 2 to a neighbor UE 425 associated with NV 2, may transmit an updated schedule for Beam 3 to a neighbor UE 425 associated with NV 3, and/or the like. In some aspects, the transmitter UE 405 may transmit an updated schedule for Beam 3 to the receiver UE 415. However, in some cases, the receiver UE 415 may update the schedule based at least in part on confirming the proposed schedule, without receiving the updated schedule from the transmitter UE 405. In this way, network resources and UE resources (e.g., processing resources, memory resources, and/or the like) may be conserved.

Additionally, or alternatively, the receiver UE 415 may transmit an updated schedule to one or more neighbor UEs 425 and/or the transmitter UE 405, in a similar manner as described above. Additionally, or alternatively, upon receiving an updated schedule, a neighbor UE 425 may transmit the updated scheduled, and/or one or more other beam-specific schedules impacted by the updated schedule, to one or more other neighbor UEs 425. In this way, an entire V2X communication network of UEs associated with vehicles may be updated, thereby improving scheduling throughout the V2X communication network.

As indicated above, FIG. 6 is provided as an example. Other examples are possible and may differ from what was described with respect to FIG. 6.

Figure 7:
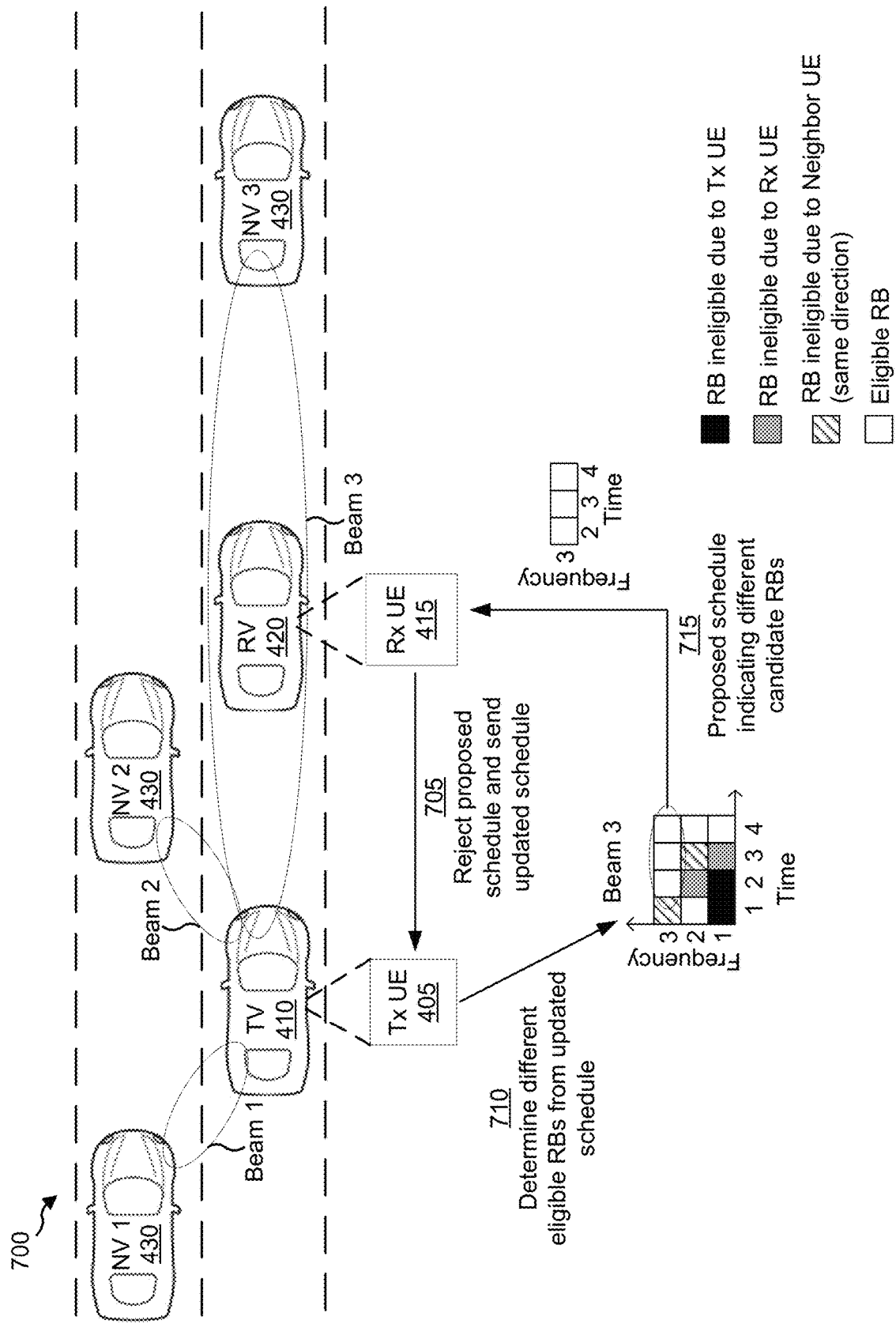

FIG. 7 is a diagram illustrating an example 700 of beam-based scheduling of V2X communications, in accordance with various aspects of the present disclosure. FIG. 7 shows an example where the receiver UE 415 (e.g., described above in connection with FIGS. 4, 5, and 6) rejects a proposed schedule received from the transmitter UE 405 (e.g., described above in connection with FIGS. 4, 5, and 6).

As shown by reference number 705, the transmitter UE 405 may receive a rejection of the proposed schedule from the receiver UE 415. For example, the receiver UE 415 may receive the proposed schedule from the transmitter UE 405, and the proposed schedule may indicate one or more candidate RBs. The receiver UE 415 may determine whether the candidate RB(s) are eligible for the V2X transmission based at least in part on a schedule stored by the receiver UE 415, as described above in connection with FIG. 6. If the receiver UE 415 determines that the candidate RBs are not eligible for the V2X transmission based at least in part on the schedule stored by the receiver UE 415, then the receiver UE 415 may transmit a rejection of the proposed schedule (e.g., the proposed candidate RBs) to the transmitter UE 405.

Additionally, or alternatively, if the receiver UE 415 determines that the candidate RBs are not eligible for the V2X transmission based at least in part on the schedule stored by the receiver UE 415, then the receiver UE 415 may transmit an updated schedule to the transmitter UE 405. In some aspects, the updated schedule may be the schedule stored by the receiver UE 415 (e.g., which may not match the schedule stored by the transmitter UE 405).

As shown by reference number 710, based at least in part on receiving the rejection and/or the updated schedule, the transmitter UE 405 may determine one or more different eligible RBs (e.g., different from the previously-selected candidate RBs). For example, the transmitter UE 405 may use the updated schedule to identify one or more different eligible RBs, and may select one or more different candidate RBs for transmission of the V2X communication, in a similar manner as described above in connection with FIGS. 4 and 5.

As shown by reference number 715, in some aspects, the transmitter UE 405 may transmit, to the receiver UE 415, a different proposed schedule (e.g., different from the previously proposed schedule) that indicates the different candidate RBs. The receiver UE 415 may determine whether the different candidate RBs are eligible using a schedule stored by the receiver UE 415, and may confirm or reject the different proposed schedule, in a similar manner as described elsewhere herein. The transmitter UE 405 may transmit the V2X communication or may identify additional eligible RBs based at least in part on whether the receiver UE 415 confirmed or rejected the proposed schedule. This may continue until the V2X transmission has been scheduled and/or transmitted. In this way, interference and RB conflicts on a particular beam may be reduced or eliminated.

As indicated above, FIG. 7 is provided as an example. Other examples are possible and may differ from what was described with respect to FIG. 7.

Figure 8:
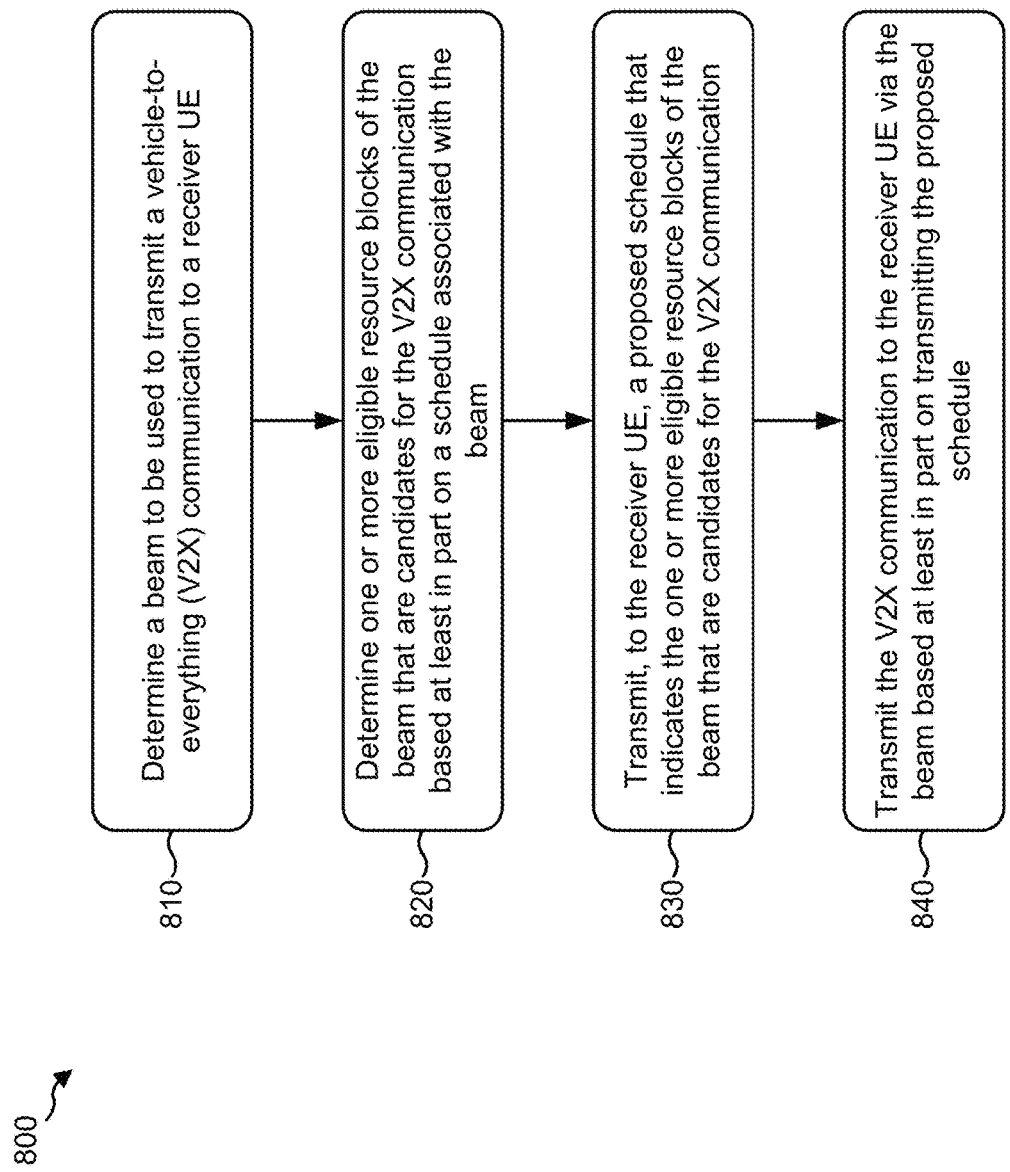
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a transmitter UE (e.g., UE 120, 305, 405, 415, 425, and/or the like) performs beam-based scheduling of V2X communications.

As shown in FIG. 8, in some aspects, process 800 may include determining a beam to be used to transmit a vehicle-to-everything (V2X) communication to a receiver UE (block 810). For example, a transmitter UE may determine a beam to be used to transmit a V2X communication to a receiver UE, as described above in connection with FIGS. 4-7.

As further shown in FIG. 8, in some aspects, process 800 may include determining one or more eligible resource blocks of the beam that are candidates for the V2X communication based at least in part on a schedule associated with the beam (block 820). For example, the transmitter UE may determine one or more eligible resource blocks of the beam that are candidates for the V2X communication, as described above in connection with FIGS. 4-7. In some aspects, the transmitter UE may determine the one or more eligible resource blocks of the beam that are candidates for the V2X communication based at least in part on a schedule associated with the beam.

As further shown in FIG. 8, in some aspects, process 800 may include transmitting, to the receiver UE, a proposed schedule that indicates the one or more eligible resource blocks of the beam that are candidates for the V2X communication (block 830). For example, the transmitter UE may transmit, to the receiver UE, a proposed schedule that indicates the one or more eligible resource blocks of the beam that are candidates for the V2X communication, as described above in connection with FIGS. 4-7.

As further shown in FIG. 8, in some aspects, process 800 may include transmitting the V2X communication to the receiver UE via the beam based at least in part on transmitting the proposed schedule (block 840). For example, the transmitter UE may transmit the V2X communication to the receiver UE via the beam based at least in part on transmitting the proposed schedule, as described above in connection with FIGS. 4-7.

In some aspects, the V2X communication is transmitted to the receiver UE using the one or more eligible resource blocks of the beam based at least in part on receiving a confirmation of the proposed schedule from the receiver UE.

In some aspects, the transmitter UE may receive a rejection of the proposed schedule from the receiver UE; may receive an updated schedule from the receiver UE; may determine a different one or more eligible resource blocks of the beam to be used for the V2X communication based at least in part on the updated schedule; and may transmit the V2X communication to the receiver UE using the different one or more eligible resource blocks of the beam. In some aspects, the V2X communication is transmitted to the receiver UE using the different one or more eligible resource blocks of the beam based at least in part on receiving a confirmation of a different proposed schedule, that indicates the different one or more eligible resource blocks, from the receiver UE.

In some aspects, the one or more eligible resource blocks are determined after receiving an updated schedule associated with the beam. In some aspects, the updated schedule is received after an initial determination that there are not enough eligible resource blocks in the schedule to transmit the V2X communication.

In some aspects, the transmitter UE may update the schedule for the beam to indicate one or more selected resource blocks to be used to transmit the V2X communication; and may transmit the updated schedule for the beam to one or more neighbor UEs.

In some aspects, the schedule is determined based at least in part on one or more scheduled V2X communications of the transmitter UE. In some aspects, the schedule is determined based at least in part on one or more scheduled V2X communications of the receiver UE. In some aspects, the schedule is determined based at least in part on one or more scheduled V2X communications of one or more neighbor UEs different from the receiver UE. In some aspects, the one or more neighbor UEs are associated with a same beam direction as the receiver UE.

In some aspects, one or more resource blocks in the schedule are determined to be ineligible if one or more neighbor UEs are communicating using the one or more resource blocks in a same beam direction as the beam to be used to transmit the V2X communication to the receiver UE. In some aspects, one or more resource blocks in the schedule are determined to be eligible if no neighbor UEs are communicating using the one or more resource blocks in a same beam direction as the beam to be used to transmit the V2X communication to the receiver UE.

In some aspects, the one or more eligible resource blocks are further determined based at least in part on a traffic demand associated with the V2X communication. In some aspects, the schedule is determined based at least in part on one or more V2X communications of the receiver UE scheduled in a same beam direction as the beam to be used to transmit the V2X communication to the receiver UE. In some aspects, the one or more eligible resource blocks in the schedule are associated with a different frequency and a same time as the one or more V2X communications scheduled in the same beam direction as the beam to be used to transmit the V2X communication to the receiver UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter user equipment (UE), comprising:
    determining a beam to be used to transmit a vehicle-to-everything (V2X) communication to a receiver UE;
    determining one or more eligible resource blocks of the beam that are candidates for the V2X communication based at least in part on a schedule associated with the beam,
        wherein one or more resource blocks in the schedule are determined to be eligible if no neighbor UEs are communicating using the one or more resource blocks in a same beam direction as the beam to be used to transmit the V2X communication to the receiver UE;
    transmitting, to the receiver UE, a proposed schedule that indicates the one or more eligible resource blocks of the beam that are candidates for the V2X communication; and
    transmitting the V2X communication to the receiver UE via the beam based at least in part on transmitting the proposed schedule.

2. The method of claim 1, wherein the V2X communication is transmitted to the receiver UE using the one or more eligible resource blocks of the beam based at least in part on receiving a confirmation of the proposed schedule from the receiver UE.

3. The method of claim 1, further comprising:
    receiving a rejection of the proposed schedule from the receiver UE;
    receiving an updated schedule from the receiver UE;
    determining a different one or more eligible resource blocks of the beam to be used for the V2X communication based at least in part on the updated schedule; and
    transmitting the V2X communication to the receiver UE using the different one or more eligible resource blocks of the beam.

4. The method of claim 3, wherein the V2X communication is transmitted to the receiver UE using the different one or more eligible resource blocks of the beam based at least in part on receiving a confirmation of a different proposed schedule, that indicates the different one or more eligible resource blocks, from the receiver UE.

5. The method of claim 1, wherein the one or more eligible resource blocks are determined after receiving an updated schedule associated with the beam.

6. The method of claim 5, wherein the updated schedule is received after an initial determination that there are not enough eligible resource blocks in the schedule to transmit the V2X communication.

7. The method of claim 1, further comprising:
    updating the schedule for the beam to indicate one or more selected resource blocks to be used to transmit the V2X communication; and
    transmitting the updated schedule for the beam to one or more neighbor UEs.

8. The method of claim 1, wherein the schedule is determined based at least in part on at least one of:
    one or more scheduled V2X communications of the transmitter UE, one or more scheduled V2X communications of the receiver UE,
one or more scheduled V2X communications of one or more neighbor UEs different from the receiver UE, or
a combination thereof.

9. The method of claim 1, wherein the schedule is determined based at least in part on one or more scheduled V2X communications of one or more neighbor UEs different from the receiver UE, and
wherein the one or more neighbor UEs are associated with a same beam direction as the receiver UE.

10. The method of claim 1, wherein one or more resource blocks in the schedule are determined to be ineligible if one or more neighbor UEs are communicating using the one or more resource blocks in a same beam direction as the beam to be used to transmit the V2X communication to the receiver UE.

11. The method of claim 1, wherein the one or more eligible resource blocks are further determined based at least in part on a traffic demand associated with the V2X communication.

12. The method of claim 1, wherein the schedule is determined based at least in part on one or more V2X communications of the receiver UE scheduled in a same beam direction as the beam to be used to transmit the V2X communication to the receiver UE.

13. The method of claim 12, wherein the one or more eligible resource blocks in the schedule are associated with a different frequency and a same time as the one or more V2X communications scheduled in the same beam direction as the beam to be used to transmit the V2X communication to the receiver UE.

14. A transmitter user equipment (UE) for wireless communication, comprising:
memory; and
one or more processors operatively coupled to the memory, the memory and the one or more processors configured to:
determine a beam to be used to transmit a vehicle-to-everything (V2X) communication to a receiver UE;
determine one or more eligible resource blocks of the beam that are candidates for the V2X communication based at least in part on a schedule associated with the beam,
wherein one or more resource blocks in the schedule are determined to be eligible if no neighbor UEs are communicating using the one or more resource blocks in a same beam direction as the beam to be used to transmit the V2X communication to the receiver UE;
transmit, to the receiver UE, a proposed schedule that indicates the one or more eligible resource blocks of the beam that are candidates for the V2X communication; and
transmit the V2X communication to the receiver UE via the beam based at least in part on transmitting the proposed schedule.

15. The transmitter UE of claim 14, wherein the V2X communication is transmitted to the receiver UE using the one or more eligible resource blocks of the beam based at least in part on receiving a confirmation of the proposed schedule from the receiver UE.

16. The transmitter UE of claim 14, wherein the one or more processors are further configured to:
receive a rejection of the proposed schedule from the receiver UE;
receive an updated schedule from the receiver UE;
determine a different one or more eligible resource blocks of the beam to be used for the V2X communication based at least in part on the updated schedule; and
transmit the V2X communication to the receiver UE using the different one or more eligible resource blocks of the beam.

17. The transmitter UE of claim 14, wherein the one or more eligible resource blocks are determined after receiving an updated schedule associated with the beam, wherein the updated schedule is received after an initial determination that there are not enough eligible resource blocks in the schedule to transmit the V2X communication.

18. The transmitter UE of claim 14, wherein the one or more processors are further configured to:
update the schedule for the beam to indicate one or more selected resource blocks to be used to transmit the V2X communication; and
transmit the updated schedule for the beam to one or more neighbor UEs.

19. The transmitter UE of claim 14, wherein the schedule is determined based at least in part on at least one of:
one or more scheduled V2X communications of the transmitter UE,
one or more scheduled V2X communications of the receiver UE,
one or more scheduled V2X communications of one or more neighbor UEs different from the receiver UE, or
a combination thereof.

20. The transmitter UE of claim 14, wherein one or more other resource blocks in the schedule are determined to be ineligible if one or more neighbor UEs are communicating using the one or more other resource blocks in a same beam direction as the beam to be used to transmit the V2X communication to the receiver UE.

21. The transmitter UE of claim 14, wherein the schedule is determined based at least in part on one or more V2X communications of the receiver UE scheduled in a same beam direction as the beam to be used to transmit the V2X communication to the receiver UE.

22. A non-transitory computer-readable medium storing instructions for wireless communication, the instructions comprising:
one or more instructions that, when executed by one or more processors of a transmitter user equipment (UE), cause the one or more processors to:
determine a beam to be used to transmit a vehicle-to-everything (V2X) communication to a receiver UE;
determine one or more eligible resource blocks of the beam that are candidates for the V2X communication based at least in part on a schedule associated with the beam,
wherein one or more resource blocks in the schedule are determined to be eligible if no neighbor UEs are communicating using the one or more resource blocks in a same beam direction as the beam to be used to transmit the V2X communication to the receiver UE;
transmit, to the receiver UE, a proposed schedule that indicates the one or more eligible resource blocks of the beam that are candidates for the V2X communication; and
transmit the V2X communication to the receiver UE via the beam based at least in part on transmitting the proposed schedule.

23. The non-transitory computer-readable medium of claim 22, wherein the V2X communication is transmitted to the receiver UE using the one or more eligible resource blocks of the beam based at least in part on receiving a confirmation of the proposed schedule from the receiver UE.

24. The non-transitory computer-readable medium of claim 22, wherein the one or more instructions further cause the one or more processors to:
   receive a rejection of the proposed schedule from the receiver UE;
   receive an updated schedule from the receiver UE;
   determine a different one or more eligible resource blocks of the beam to be used for the V2X communication based at least in part on the updated schedule; and
   transmit the V2X communication to the receiver UE using the different one or more eligible resource blocks of the beam.

25. The non-transitory computer-readable medium of claim 22, wherein the schedule is determined based at least in part on at least one of:
   one or more scheduled V2X communications of the transmitter UE,
   one or more scheduled V2X communications of the receiver UE,
   one or more scheduled V2X communications of one or more neighbor UEs different from the receiver UE, or
   a combination thereof.

26. A transmitter apparatus for wireless communication, comprising:
   means for determining a beam to be used to transmit a vehicle-to-everything (V2X) communication to a receiver apparatus;
   means for determining one or more eligible resource blocks of the beam that are candidates for the V2X communication based at least in part on a schedule associated with the beam,
      wherein one or more resource blocks in the schedule are determined to be eligible if no neighbor UEs are communicating using the one or more resource blocks in a same beam direction as the beam to be used to transmit the V2X communication to the receiver apparatus;
   means for transmitting, to the receiver apparatus, a proposed schedule that indicates the one or more eligible resource blocks of the beam that are candidates for the V2X communication; and
   means for transmitting the V2X communication to the receiver apparatus via the beam based at least in part on transmitting the proposed schedule.

27. The transmitter apparatus of claim 26, wherein the V2X communication is transmitted to the receiver apparatus using the one or more eligible resource blocks of the beam based at least in part on receiving a confirmation of the proposed schedule from the receiver apparatus.

28. The transmitter apparatus of claim 26, further comprising:
   means for receiving a rejection of the proposed schedule from the receiver apparatus;
   means for receiving an updated schedule from the receiver apparatus;
   means for determining a different one or more eligible resource blocks of the beam to be used for the V2X communication based at least in part on the updated schedule; and
   means for transmitting the V2X communication to the receiver apparatus using the different one or more eligible resource blocks of the beam.

29. The transmitter apparatus of claim 26, wherein the schedule is determined based at least in part on at least one of:
   one or more scheduled V2X communications of the transmitter apparatus,
   one or more scheduled V2X communications of the receiver apparatus,
   one or more scheduled V2X communications of one or more neighbor apparatuses different from the receiver apparatus, or
   a combination thereof.

30. The transmitter apparatus of claim 26, wherein the one or more eligible resource blocks are further determined based at least in part on a traffic demand associated with the V2X communication.

* * * * *